US009200545B2

(12) United States Patent
Washino et al.

(10) Patent No.: US 9,200,545 B2
(45) Date of Patent: Dec. 1, 2015

(54) TORQUE CONTROL DEVICE AND VALVE TIMING CONTROL APPARATUS

(71) Applicant: DENSO CORPORATION, Kariya, Aichi-pref. (JP)

(72) Inventors: Seiichiro Washino, Nagoya (JP); Takashi Furukawa, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/459,604

(22) Filed: Aug. 14, 2014

(65) Prior Publication Data
US 2015/0059674 A1    Mar. 5, 2015

(30) Foreign Application Priority Data

Aug. 27, 2013  (JP) .................................. 2013-175816

(51) Int. Cl.
| | |
|---|---|
| *F01L 1/34* | (2006.01) |
| *F01L 1/344* | (2006.01) |
| *F16D 57/00* | (2006.01) |
| *F16F 9/53* | (2006.01) |
| *F01L 1/352* | (2006.01) |

(52) U.S. Cl.
CPC ............. *F01L 1/34409* (2013.01); *F01L 1/352* (2013.01); *F16D 57/002* (2013.01); *F16F 9/53* (2013.01); *F01L 2001/34479* (2013.01); *F01L 2001/3522* (2013.01)

(58) Field of Classification Search
CPC .................. F01L 1/34409; F01L 2001/34479; F01L 2001/3522; F16D 57/002
USPC .......................................... 123/90.15, 90.17
See application file for complete search history.

(56) References Cited

U.S. PATENT DOCUMENTS

| | | | |
|---|---|---|---|
| 8,733,307 B2 * | 5/2014 | Washino ................. | F01L 1/344 123/90.15 |
| 2011/0303170 A1 | 12/2011 | Morishima | |
| 2013/0074793 A1 | 3/2013 | Washino et al. | |

FOREIGN PATENT DOCUMENTS

| | | |
|---|---|---|
| JP | 2004-218457 | 8/2004 |
| JP | 2006-171463 | 6/2006 |
| JP | 2010-112527 | 5/2010 |
| JP | 2010-164118 | 7/2010 |
| JP | 2013-033980 | 2/2013 |

OTHER PUBLICATIONS

Japanese Patent Office, "Notification of Reason(s) for Refusal," (2 pages) issued in connection with Japanese Patent Application No. 2013-175816, dated Jul. 28, 2015, with its English language Translation (3 pages).

* cited by examiner

*Primary Examiner* — Ching Chang
(74) *Attorney, Agent, or Firm* — Nixon & Vanderhye PC (57) ABSTRACT

A torque control device includes a seal structure sealing a clearance between a hollow object and a rotation shaft. The seal structure includes a particle seal, a liquid seal, an intermediate fluid which fills a middle chamber defined between the particle seal and the liquid seal, and a coating film having a hardness higher than that of magnetic particle. The coating film is arranged to at least at a seal perimeter part of the rotation shaft, and a seal gap is defined between the particle seal and the seal perimeter part.

11 Claims, 10 Drawing Sheets

TORQUE CONTROL DEVICE AND VALVE TIMING CONTROL APPARATUS

CROSS REFERENCE TO RELATED APPLICATION

This application is based on Japanese Patent Application No. 2013-175816 filed on Aug. 27, 2013, the disclosure of which is incorporated herein by reference in its entirety.

TECHNICAL FIELD

The present disclosure relates to a torque control device and a valve timing control apparatus.

BACKGROUND

A torque control device includes a functional fluid with which a fluid chamber of a hollow object is filled. The functional fluid is in contact with an adjustment rotor. When a magnetic flux passes through the functional fluid, a viscosity of the fluid is varied. The torque control device controls a torque by variably controlling the viscosity of fluid. The torque control device may be a fluid brake device which controls a brake torque braking an adjustment rotor according to the viscosity of functional fluid, or a liquid clutch device which controls a clutch torque transmitted between a hollow object and an adjustment rotor according to the viscosity of functional fluid.

JP 2013-83244A (US 2013/0074793 A1) describes a torque control device in which a functional fluid contains magnetic particles suspended in a base liquid. A space between a hollow object and a rotation shaft is sealed by a seal structure to seal the functional fluid inside the hollow object. Specifically, the seal structure includes a particle seal, a liquid seal and an intermediate fluid. A seal gap is defined between the rotation shaft and the particle seal to regulate a flow of the magnetic particle. The liquid seal seals a clearance between the rotation shaft and the liquid seal by liquid-tightly contacting the rotation shaft when the rotation shaft slidingly rotates. A middle chamber between the particle seal and the liquid seal is filled with the liquefied intermediate fluid.

In such a seal structure, the seal gap between the rotation shaft and the particle seal can reduce wearing caused by the sliding movement. Under this situation, the particle seal restricts the magnetic particle from leaking out of the hollow object through the seal gap communicating with the fluid chamber. Moreover, in the seal structure, the liquid seal located on the outer side of the particle seal achieves the seal function relative to the liquefied intermediate fluid in the middle chamber between the particle seal and the liquid seal, by liquid-tightly and slidingly contacting with the rotation shaft. As a result, the pressure in the fluid chamber is transmitted to the base liquid which flew into the seal gap from the fluid chamber, and further transmitted to the intermediate fluid in the middle chamber, then, is received by the liquid seal, so the base liquid which receives the pressure can be restricted from leaking out. Thus, lowering in the durability caused by the wearing can be restricted, and variation in the torque adjustment characteristic (brake characteristic) caused by the leakage of functional fluid can be restricted.

Generally, the slidingly moving distance is much larger in the seal structure for the rotation shaft than in a seal structure for a linearly moving shaft. Therefore, the requirement for reducing the wearing becomes severe in the seal structure for the rotation shaft.

However, the wearing may be caused even in a case where the seal gap is formed, if a magnetic particle enters and stays in the seal gap between the rotation shaft and the particle seal, from the fluid chamber, for a long period of time.

If the stagnation of magnetic particle arises, on the surface of the perimeter part of the rotation shaft made of metal, the metal oxide film formed on the surface is subject to wear by the sliding movement. As a result, the metal becomes in the exposed state, and the surface of metal is activated. When the surface of metal is in contact with the magnetic particle and the base liquid under a high temperature state, a sludge may be generated on the surface of metal. The sludge expands the seal gap and makes it easy to leak the magnetic particle.

SUMMARY

It is an object of the present disclosure to provide a torque control device improved in the durability and the stabilization in the torque adjustment performance, and a valve timing control apparatus having the torque control device.

According to an aspect of the present disclosure, a torque control device includes a hollow object, a functional fluid, a viscosity control portion, an adjustment rotor, and a seal structure. A fluid chamber is defined in the hollow object. The functional fluid contains a magnetic particle suspended in a base liquid, and the fluid chamber is filled with the functional fluid. The viscosity control portion variably controls a viscosity of the functional fluid by causing a magnetic flux to pass through the functional fluid in the fluid chamber. The adjustment rotor has a rotation shaft passing through the hollow object, and a torque given to the rotation shaft is controlled according to the viscosity of the functional fluid by contacting the functional fluid in the fluid chamber. The seal structure seals a clearance between the hollow object and the rotation shaft. The seal structure includes a particle seal, a liquid seal, an intermediate fluid, and a coating film. The particle seal surrounds a perimeter part of the rotation shaft and is held by the hollow object. A seal gap is defined between the particle seal and the rotation shaft, and communicates with the fluid chamber such that the particle seal regulates the magnetic particle from flowing out of the hollow object. The liquid seal is held by the hollow object at an exterior side of the particle seal. The liquid seal is liquid-tightly and slidingly in contact with the perimeter part of the rotation shaft to seal a clearance spaced from the rotation shaft. The intermediate fluid fills a middle chamber defined between the particle seal and the liquid seal. The coating film has a hardness higher than that of the magnetic particle. The coating film is arranged to the perimeter part of the rotation shaft, at least at a seal perimeter part made of metal, and the seal gap is defined between the particle seal and the seal perimeter part.

Accordingly, the coating film is difficult to wear by the magnetic particle in the seal gap. Therefore, the surface of metal forming the seal perimeter part is restricted from being activated, so a generation of sludge is restricted. Further, the seal gap is restricted from expanding, and a magnetic particle can be restricted from leaking through the seal gap. Thus, the durability can be improved by restricting the sludge generation, and the torque adjustment performance can be made stable by restricting the leakage of the magnetic particle.

For example, the surface coarseness of the coating film is set smaller than the outer diameter of the magnetic particle.

Accordingly, it is difficult for the magnetic particle to enter a recess portion on the surface of the coating film. Therefore, the sludge generation can be restricted. Thus, the durability can be improved, and the torque adjustment performance can be made stable.

For example, a valve timing control apparatus which controls a valve timing of a valve opened and closed by a camshaft by a torque transmitted from a crankshaft in an internal combustion engine includes the torque control device and a phase control mechanism linked with the rotation shaft outside of the hollow object. The phase control mechanism controls a relative phase of the camshaft relative to the crankshaft according to a brake torque given from the rotation shaft.

Accordingly, since the torque control device applied to valve timing control apparatus can restrict from having a variation in the adjustment characteristic of brake torque, the phase adjustment accuracy can be kept better.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
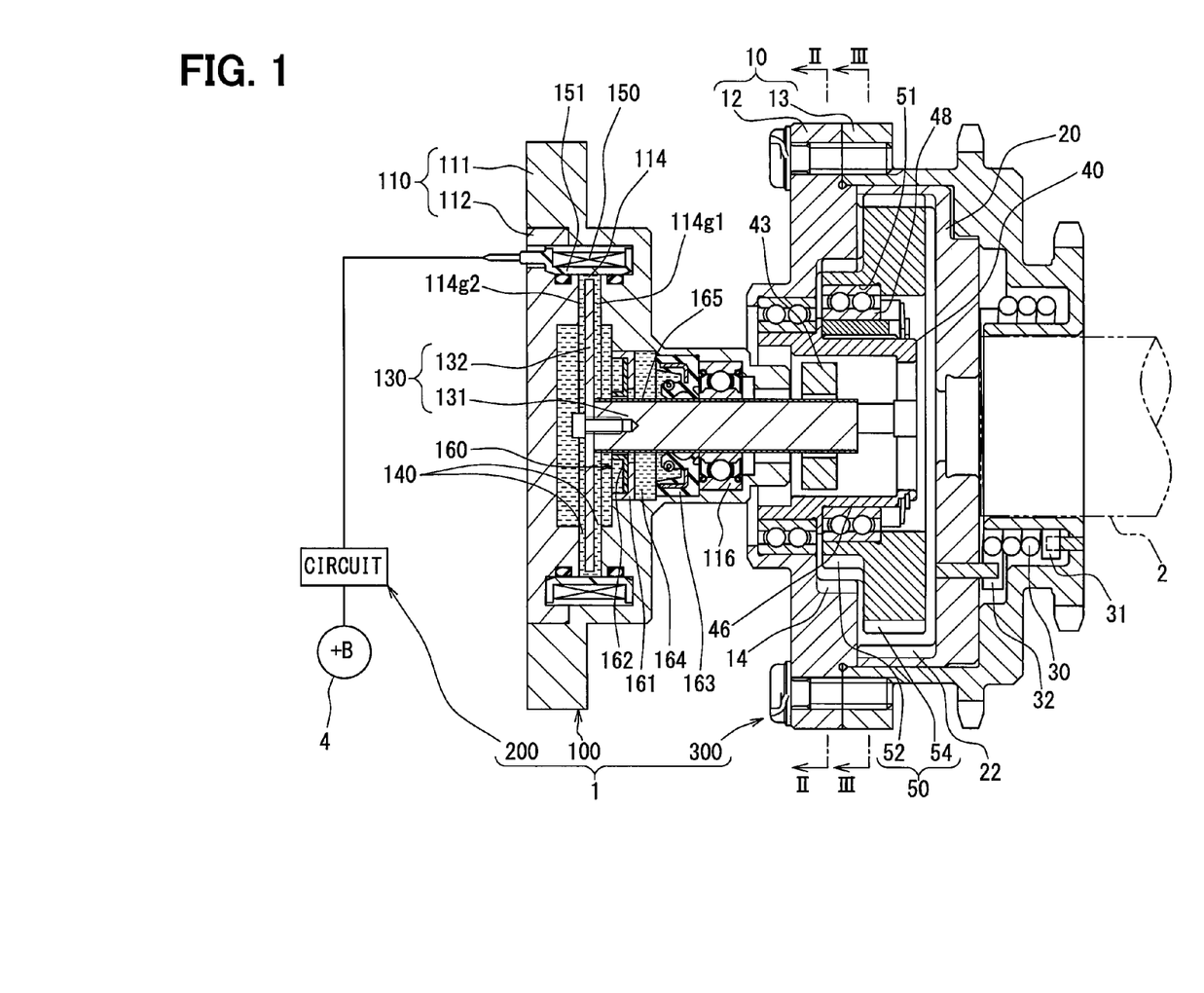
FIG. 1 is a cross-sectional view illustrating a valve timing control apparatus having a torque control device according to a first embodiment.

A valve timing control apparatus 1 shown in FIG. 1 is arranged in a power train system in which an engine torque is transmitted from a crankshaft (not shown) to a camshaft 2 of an internal-combustion engine in a vehicle. The valve timing control apparatus 1 includes a torque control device 100. The camshaft 2 opens and closes an intake valve (not shown) of the engine by transfer of the engine torque, and the valve timing control apparatus 1 controls the valve timing of the intake valve.

Figure 2:
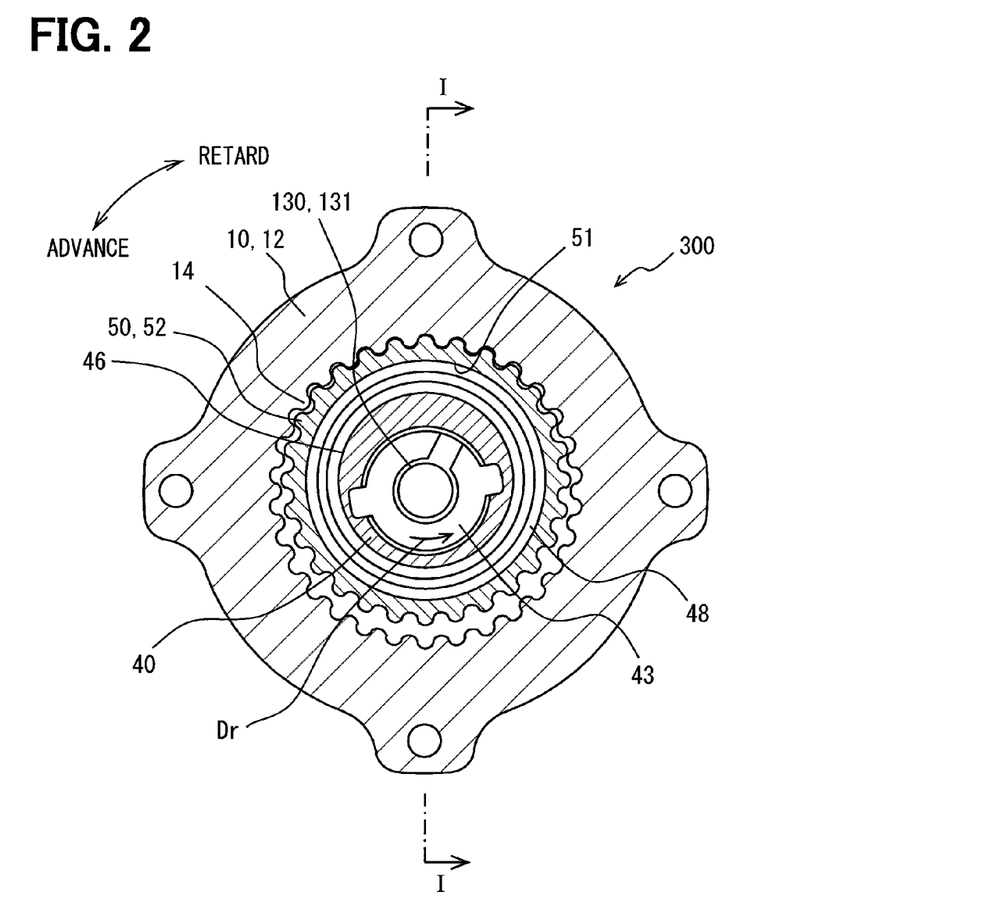
FIG. 2 is a cross-sectional view taken along a line II-II in FIG. 1.
Figure 3:
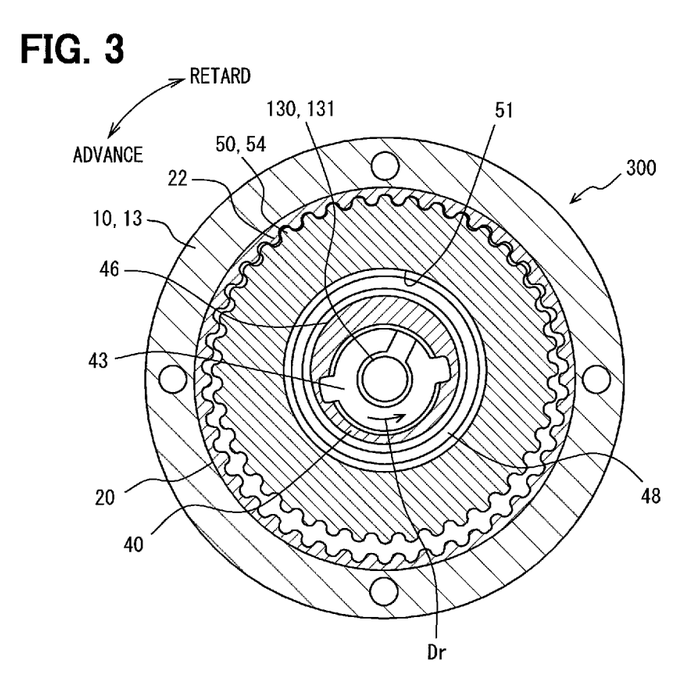
FIG. 3 is a cross-sectional view taken along a line in III-III FIG. 1.

As shown in FIGS. 1-3, the valve timing control apparatus 1 includes a control circuit 200 and a phase control mechanism 300 in addition to the torque control device 100. The valve timing control apparatus 1 controls the engine phase which is a relative phase of the camshaft 2 relative to the crankshaft, so as to realize a desired valve timing. FIG. 1 is a cross-sectional view taken along a line I-I in FIG. 2.

(Torque Control Device)

The torque control device 100 corresponds to a fluid brake equipment. The torque control device 100 includes a hollow object 110, an adjustment rotor 130, a functional fluid 140, a solenoid coil 150, and a seal structure 160.

The hollow object 110 has a hollow shape as a whole and has a fixed component 111 and a cover component 112. The fixed component 111 is made of metal magnetic material, and has a stepped cylindrical shape. The fixed component 111 is fixed at a position of a fixed portion (not shown) such as a chain cover in the internal-combustion engine. The cover component 112 is made of metal magnetic material and has a circular plate shape. The cover component 112 is arranged at the opposite side of the phase control mechanism 300 through the fixed component 111 in the axial direction. The cover component 112 is coaxially and liquid-tightly fixed to the fixed component 111 by fitting, such that a fluid chamber 114 is defined between the cover component 112 and the fixed components 111.

The adjustment rotor 130 has a rotation shaft 131 and a magnetic rotor 132. The rotation shaft 131 is made of metal. The rotation shaft 131 coaxially passes through the fixed component 111 of the hollow object 110 adjacent to the phase control mechanism 300. The rotation shaft 131 has an axial end projected from the hollow object 110, and the axial end is linked to the phase control mechanism 300 at the exterior. An intermediate part of the rotation shaft 131 in the axial direction is rotatably supported by a bearing 116 disposed to the fixed component 111 of the hollow object 110. The adjustment rotor 130 is rotated by the engine torque transmitted from the crankshaft via the phase control mechanism 300 in a fixed rotational direction Dr (counterclockwise in FIGS. 2 and 3).

As shown in FIG. 1, the magnetic rotor 132 is made of metal magnetic material, and has a ring board shape. The magnetic rotor 132 is projected outward in the radial direction from an axial end of the rotation shaft 131 opposite from the phase control mechanism 300, and is accommodated in the fluid chamber 114 of the hollow object 110.

The fluid chamber 114 has a first magnetism gap 114g1 defined between the magnetic rotor 132 and the fixed component 111 in the axial direction, and a second magnetism gap 114g2 defined between the magnetic rotor 132 and the cover component 112 in the axial direction. The first magnetism gap 114g1 continues in the rotational direction Dr, and the second magnetism gap 114g2 continues in the rotational direction Dr.

The fluid chamber 114 having the magnetism gaps 114g1, 114g2 is fully filled with the functional fluid 140. In this embodiment, the functional fluid 140 is magnetic viscous fluid in which magnetic particles 140p are suspended and distributed in a base liquid 140l (also see FIG. 6).

The magnetic particle 140p is made of powdered metal such as carbonyl iron having the minimum particle diameter of, for example, about three micrometers. The base liquid 140l is nonmagnetic nonpolar liquid (hydrophobic liquid) which is maintained to have the liquid phase under the environment where the internal-combustion engine is used. For example, the base liquid 140*l* may be lubricous oil used for the internal-combustion engine.

Figure 4:
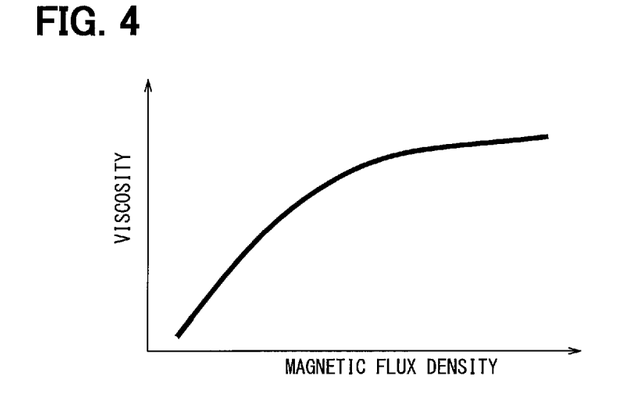
FIG. 4 is a graph illustrating a relationship between a density of magnetic flux and a viscosity of magnetic fluid.

As shown in FIG. 4, the apparent viscosity of the functional fluid 140 which consists of the magnetic particles 140*p* and the base liquid 140*l* is raised as the density of magnetic flux passing the functional fluid 140 is increased, under the state where the functional fluid 140 is in contact with the whole surface of the magnetic rotor 132. Thereby, the yield stress is increased according to the viscosity.

As shown in FIG. 1, the solenoid coil 150 has a plastic bobbin 151 and a metal wire wound around the bobbin 151. The solenoid coil 150 is coaxially arranged on the perimeter side of the magnetic rotor 132. The solenoid coil 150 is interposed between the fixed component 111 and the cover component 112 in the axial direction, and the hollow object 110 coaxially holds the solenoid coil 150. When electric power is supplied to the solenoid coil 150, the magnetic flux is generated to flow in order of the fixed component 111, the first magnetism gap 114*g*1, the magnetic rotor 132, the second magnetism gap 114*g*2 and the cover component 112.

Therefore, while the engine is rotated to rotate the adjustment rotor 130, when the solenoid coil 150 generates the magnetic flux in response to the electric power, the magnetic flux passes through the functional fluid 140 in the magnetism gap 114*g*1, 114*g*2 of the fluid chamber 114. As a result, the yield stress is generated at the space between the hollow object 110 and the magnetic rotor 132 contacting with the functional fluid 140 by the variation in the viscosity of the fluid 140, such that the adjustment rotor 130 is braked. The brake torque is given to the rotation shaft 131 in a direction (clockwise in FIGS. 2 and 3) opposite from the rotational direction Dr. In this embodiment, the solenoid coil 150 causes the magnetic flux to pass through the functional fluid 140 in the fluid chamber 114 so as to variably control the viscosity of the fluid 140, such that the brake torque given to the rotation shaft 131 is controlled.

Figure 5:
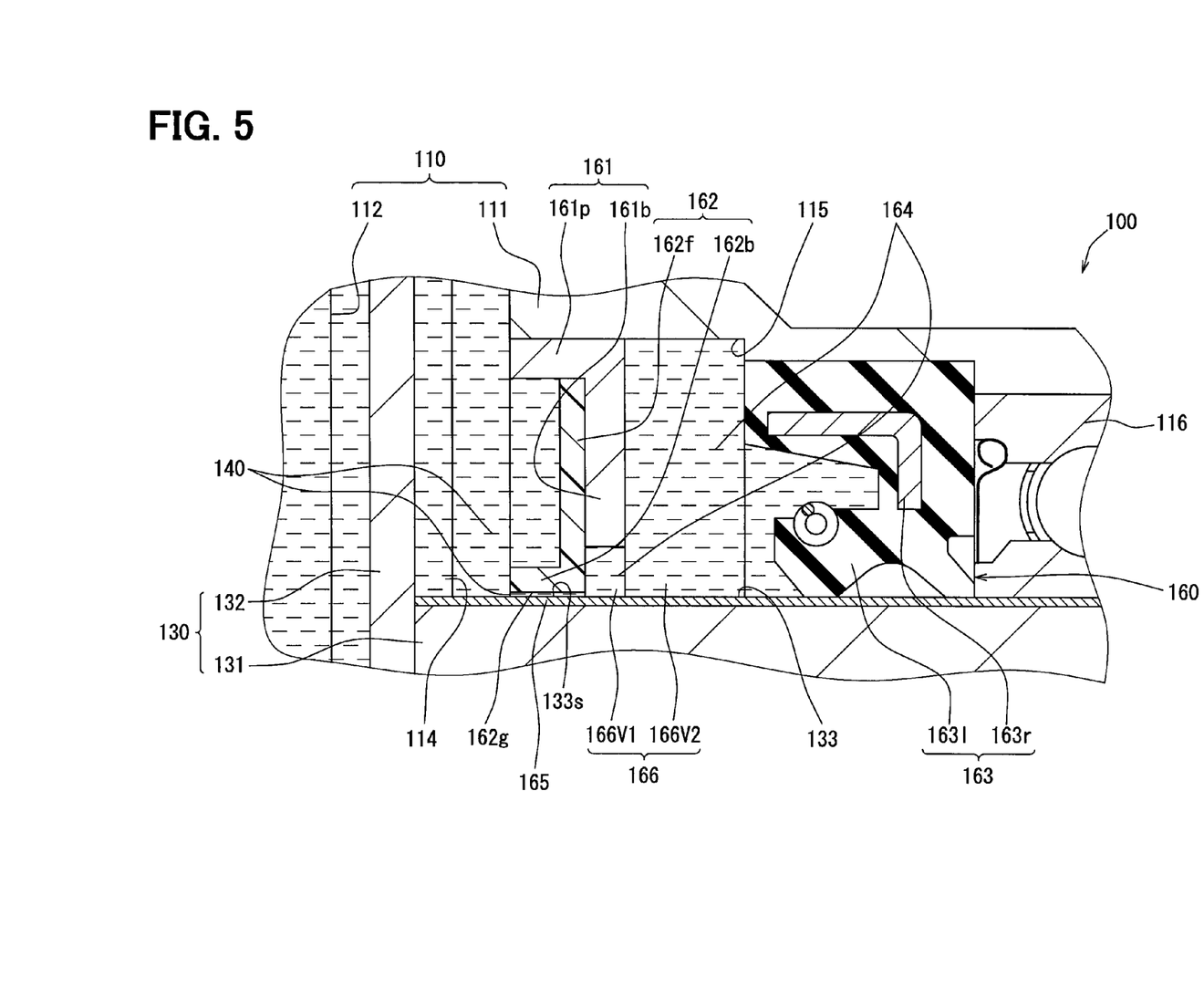
FIG. 5 is an enlarged cross-sectional view illustrating a seal structure of the torque control device of the first embodiment.

As shown in FIGS. 1 and 5, the seal structure 160 is disposed between the fluid chamber 114 and the bearing 116 in the axial direction, inside the hollow object 110. The seal structure 160 seals a clearance between the fixed component 111 of the hollow object 110 and the rotation shaft 131 of the adjustment rotor 130, such that the functional fluid 140 is restricted from leaking out of the hollow object 110.

(Control Circuit)

The control circuit 200 includes a microcomputer, and is arranged outside of the torque control device 100. The control circuit 200 is electrically connected to the solenoid coil 150 and a battery 4 of the vehicle. While the engine is operated, the control circuit 200 receives electric power from the battery 4, and variably controls the viscosity of the functional fluid 140 by controlling the electric power supplied to the solenoid coil 150. As a result, the brake torque given to the rotation shaft 131 is accurately controlled to increase and decrease. In the first embodiment, the control circuit 200 and the solenoid coil 150 correspond to a viscosity control portion.

(Phase Control Mechanism)

As shown in FIGS. 1-3, the phase control mechanism 300 includes a driving rotor 10, a driven rotor 20, an assistant component 30, a planet carrier 40, and a planet gear 50.

The driving rotor 10 is made of metal, and is formed to have a hollow shape by fixing a gear component 12 and a sprocket component 13 with each other. The gear component 12 has a drive side annular-gear part 14 in which the diameter is smaller in the tip circle than in the root circle. The sprocket component 13 is coordinated with the crankshaft through a timing chain (not shown). While the engine is operated, the engine torque is transmitted to the sprocket component 13 from the crankshaft, and the driving rotor 10 rotates in the fixed rotational direction (counterclockwise in FIGS. 2 and 3).

The driven rotor 20 is made of metal, and is coaxially accommodated in the driving rotor 10 and is connected with the camshaft 2. While the engine is operated, the driven rotor 20 is interlocked with the camshaft 2 to rotate in the fixed rotational direction (counterclockwise in FIGS. 2 and 3). Further, the driven rotor 20 is able to rotate relative to the driving rotor 10. The driven rotor 20 has a driven side annular-gear part 22 in which the diameter is smaller in the tip circle than in the root circle.

The assistant component 30 is made of a metal torsion coil spring, and is coaxially accommodated in the driving rotor 10 to be interposed between the driving rotor 10 and the driven rotor 20. The assistant component 30 has a first end 31 engaged with the driving rotor 10 and a second end 32 engaged with the driven rotor 20. An assistant torque is generated by the twisting deformation of the assistant component 30 between the first end 31 and the second end 32 so as to bias the driven rotor 20 to the retard side relative to the driving rotor 10.

The planet carrier 40 is made of metal, and is accommodated in the driving rotor 10. The planet carrier 40 is coaxially connected on the rotation shaft 131 through a joint 43. While the engine is operated, the planet carrier 40 is rotated in the fixed rotational direction (counterclockwise in FIGS. 2 and 3) integrally with the adjustment rotor 130. Further, the planet carrier 40 is able to rotate relative to the driving rotor 10.

The planet carrier 40 has a bearing part 46 positioned eccentric to the rotation shaft 131, and the bearing part 46 has a shape of a cylindrical surface. The bearing part 46 is coaxially fitted to a main hole 51 of the planet gear 50 through a planet bearing 48. The planet gear 50 can have a planet movement according to the relative rotation of the planet carrier 40 relative to the driving rotor 10.

The planet gear 50 is made of metal, and has external-gear parts 52 and 54 in which the diameter is larger in the tip circle than in the root circle. The drive side external-gear part 52 is eccentrically positioned on the inner circumference side of the drive side annular-gear part 14, and meshes with the annular-gear part 14. The driven side external-gear part 54 is eccentrically positioned on the inner circumference side of the driven side annular-gear part 22, and meshes with the annular-gear part 22.

The phase control mechanism 300 controls the engine phase according to the brake torque given from the rotation shaft 131 and the assistant torque given from the assistant component 30 in the opposite direction opposite from the brake torque. Specifically, when the rotation shaft 131 is rotated at the same speed as the driving rotor 10, for example, by holding the brake torque, and when the planet carrier 40 is not rotated relative to the driving rotor 10, the planet gear 50 is rotated with the rotors 10 and 20, without carrying out the planet movement. As a result, the engine phase is held.

On the other hand, when the rotation shaft 131 is rotated with a speed slower than the driving rotor 10 by increase in the brake torque, and when the planet carrier 40 is rotated to the retard side relative to the rotor 10, the driven rotor 20 is rotated to the advance side relative to the driving rotor 10 by the planet movement of the planet gear 50. As a result, the engine phase is advanced.

Moreover, when the rotation shaft 131 is rotated with a speed higher than the driving rotor 10 by decrease in the brake torque, and when the planet carrier 40 is rotated to the advance side relative to the rotor 10, the driven rotor 20 is rotated to the retard side relative to the driving rotor 10 by the planet movement of the planet gear 50. As a result, the engine phase is retarded.

(Seal Structure)

Hereafter, details of the seal structure 160 are explained. As shown in FIGS. 1 and 5, the seal structure 160 seals the functional fluid 140 inside of the hollow object 110, and has a seal holder 161, a particle seal 162, a liquid seal 163, an intermediate fluid 164, and a coating film 165. In the following explanation, the common axial direction of the hollow object 110 and the rotation shaft 131 is referred to an axial direction. Moreover, the inside of the hollow object 110 which defines the fluid chamber 114 is only called as an inside (interior) or inner side, and the outside of the hollow object 110 in which the phase control mechanism 300 is arranged is only called as an outside (exterior) or outer side.

As shown in FIG. 5, the seal holder 161 is made of metal, and has a shape of a based cylinder. A fitting hole 115 is defined on the inner circumference part of the fixed component 111. The seal holder 161 is fixed and held at the hollow object 110 by fitting to the axially inside end of the fitting hole 115. The seal holder 161 is coaxially arranged on the perimeter side of the rotation shaft 131, and surrounds the perimeter part 133 of the shaft 131 along the rotational direction Dr.

The particle seal 162 has a cylindrical shape with a flange (a shape of a hat). The particle seal 162 of this embodiment is shaped in a mesh made of polytetrafluoroethylene (PTFE), and filters the functional fluid 140 to collect the magnetic particle 140p. The particle seal 162 may be made of other plastic material other than PTFE shaped in a mesh, and may be made of porous ceramics to filter the functional fluid 140. Alternatively, the particle seal 162 may be shaped in fibers made of plastic or ceramics.

The particle seal 162 has a circular seal flange 162f and a cylindrical main part 162b projected from the inner circumference end of the flange 162f inward in the axial direction. The seal flange 162f is supported by the bottom wall part 161b of the seal holder 161 from the outer side in the axial direction. Under this state, the seal flange 162f is fixed by fitting at the peripheral wall part 161p of the seal holder 161 so as to be held at the hollow object 110.

The main part 162b is coaxially arranged at the perimeter side of the rotation shaft 131, and surrounds the perimeter part 133 of the shaft 131 along the rotational direction Dr. A portion of the perimeter part 133 surrounded by the main part 162b in the axial direction defines a seal perimeter part 133s, and a seal gap 162g is defined between the main part 162b and the seal perimeter part 133s. The inside diameter of the inner circumference part of the main part 162b is set at a substantially constant value from one end to the other end in the axial direction.

Figure 6:
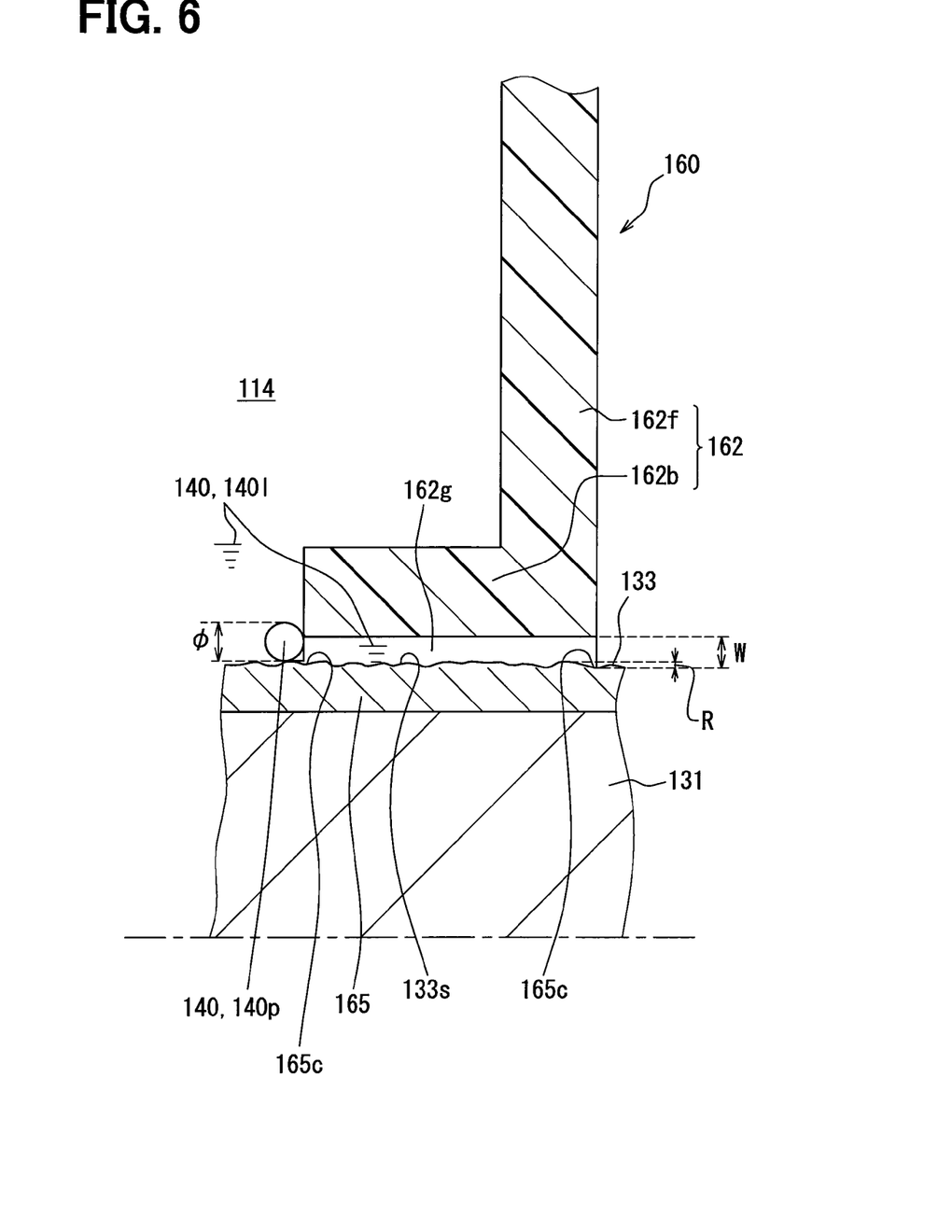
FIG. 6 is an explanatory view explaining characteristics of the seal structure.

In this way, the seal gap 162g defined between the main part 162b and the seal perimeter part 133s communicates with the fluid chamber 114 on the interior side in the axial direction as a clearance portion. As shown in FIG. 6, the seal gap 162g has a dimension of W in the radial direction, and continues in the rotational direction Dr. The surface of the seal perimeter part 133s has a recess portion 165c. The dimension W of the seal gap 162g is set to be smaller than the outer diameter ($\phi$) (for example, the minimum diameter of a particle) of the magnetic particle 140p of the functional fluid 140 even at the recess portion 165c where the dimension W becomes the maximum.

Therefore, while the base liquid 140l of the functional fluid 140 can flow into the seal gap 162g from the fluid chamber 114 on the interior side in the axial direction, the magnetic particle 140p in the fluid 140 is restricted from flowing into the seal gap 162g. As a result, the flow of the magnetic particle 140p is restricted from flowing from the inside to the outside in the axial direction through the seal gap 162g filled with the base liquid 140l. This effect is further enhanced together with the filtering function of the particle seal 162.

The liquid seal 163 has a cylindrical shape as a whole. The liquid seal 163 is fixed by fitting to the fitting hole 115 on the outer side of the particle seal 162 in the axial direction so as to be held at the hollow object 110. The liquid seal 163 is coaxially arranged at the perimeter side of the rotation shaft 131, and surrounds the perimeter part 133 of the shaft 131 along the rotational direction Dr. The liquid seal 163 is what is called an oil seal, and includes a metal ring 163r and a seal lip 163l made of synthetic rubber and fitted to the metal ring 163r. The seal lip 163l liquid-tightly and slidingly contacts the perimeter part 133, which is on the outer side of the seal perimeter part 133 in the axial direction, throughout in the rotational direction Dr, so the clearance spaced from the rotation shaft 131 is sealed by the liquid seal 163.

The middle chamber 166 is defined between the liquid seal 163 and the particle seal 162 which is distanced from the liquid seal 163 on the inner side in the axial direction. The middle chamber 166 has a first part 166v1 surrounded by the bottom wall part 161b of the seal holder 161. In FIG. 5, the cross sectional area of the first part 166v1 is larger than the cross sectional area of the seal gap 162g communicating with the first part 166v1 in the axial direction. The middle chamber 166 has a second part 166v2 surrounded by the fitting hole 115 on the exterior side of the seal holder 161 in the axial direction. The cross sectional area of the second part 166v2 is larger than the cross sectional area of the first part 166v1 communicating with the second part 166v2 in the axial direction.

The middle chamber 166 has the first part 166v1 and the second part 166v2, and is filled with the liquefied intermediate fluid 164. The intermediate fluid 164 of this embodiment contains a liquid similar to the base liquid 140l of the functional fluid 140, that is, nonmagnetic nonpolar liquid (hydrophobic liquid) which can be maintained to have a liquid phase under an environment where the engine is used, for example, lubricous oil for the engine. The intermediate fluid 164 may be the same fluid as the functional fluid 140, or may be a fluid having properties similar to the properties of the functional fluid 140.

The coating film 165 is formed on all the perimeter part 133 to cover at least the seal perimeter part 133s made of metal on the rotation shaft 131. The coating film 165 has a hardness higher than that of the magnetic particle 140p of the functional fluid 140. For example, the coating film 165 has Vickers hardness more than or equal to 1000HV, while the magnetic particle 140p has Vickers hardness of 110HV. The coating film 165 of this embodiment has a thin-film cylinder shape continuing in the rotational direction Dr and is made of, for example, diamond-like carbon (DLC) with Vickers hardness of about 3000HV so as to suitably realize the above-described hardness. Alternatively, the coating film 165 may be made of titanium nitride (TiN) with Vickers hardness of about 1600HV.

Figure 7:
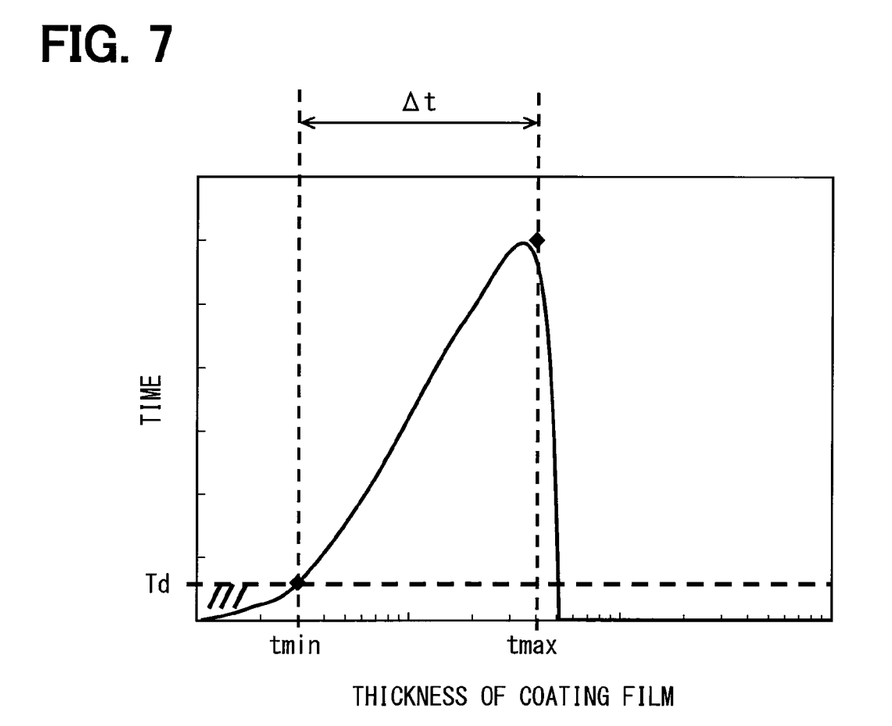
FIG. 7 is a characteristic graph explaining characteristics of the seal structure.

The thickness of the coating film 165 in the radial direction is set in a predetermined range At which is shown in FIG. 7. Specifically, the lower limit tmin of the range At is set at, for example, 3 micrometers, considering the durable time period Td required for the torque control device 100. The durable time period Td is set, for example, as 3000 h during which the leak of the magnetic particle 140p is not generated through the seal gap 162g due to a breakage of the coating film 165.

The upper limit tmax of the range Δt is set at, for example, 40 micrometers, considering the surface coarseness R (refer to FIG. 6) required for the coating film 165. The surface coarseness R (for example, the maximum height of the projection and recess on the surface) is set smaller than the outer diameter (1) of the magnetic particle 140p (for example, the minimum diameter of a particle) such that the magnetic particle 140p is prevented from entering the recess portion 165c (refer to FIG. 6) on the surface of the coating film 165 at the seal gap 162g.

The effects and advantages achieved in the first embodiment are explained below.

The coating film 165 is disposed at least at the seal perimeter part 133s made of metal, of the perimeter part 133 of the rotation shaft 131, and has a hardness higher than that of the magnetic particle 140p. Wear and abrasion is difficult to occur at the coating film 165 because the magnetic particle 140p is prevented from entering the seal gap 162g between the particle seal 162 and the rotation shaft 131. Therefore, the surface of the metal forming the seal perimeter part 133s is restricted from being activated, such that a sludge is not generated.

Further, the magnetic particle 140p can be restricted from leaking through the seal gap 162g. Therefore, the durability is improved by restricting the generation of sludge, and the torque adjustment performance can be made stable by restricting the leakage.

Moreover, at the seal gap 162g between the particle seal 162 and the coating film 165 having the surface coarseness R smaller than the outer diameter ($\phi$) of the magnetic particle 140p, the magnetic particle 140p is difficult to enter the recess portion 165c on the surface of the film 165. Therefore, the generation of sludge can be restricted not only by the high hardness coating film 165. Thus, the durability can be improved, and the torque adjustment performance can be made stable.

Furthermore, the coating film 165 is arranged at all of the perimeter part 133 of the rotation shaft 131, and certainly covers the seal perimeter part 133s. According to this, the generation of sludge can be prevented, and the durability and the stabilization in the torque adjustment performance can be improved.

Furthermore, the dimension W of the seal gap 162g is set smaller than the outer diameter $\phi$ of the magnetic particle 140p, so the magnetic particle 140p cannot enter the seal gap 162g. Therefore, the generation of sludge can be further restricted. Thus, the durability can be improved, and the torque adjustment performance can be made stable.

In addition, the particle seal 162 shaped in a mesh made of PTFE can catch the magnetic particle 140p even if the magnetic particle 140p entered the seal gap 162g spaced from the seal perimeter part 133s. Therefore, the generation of sludge can be restricted. Thus, the durability can be improved, and the torque adjustment performance can be made stable.

Moreover, if the base liquid 140l flows into the seal gap 162g from the fluid chamber 114, and if the base liquid 140l further flows into the middle chamber 166 and is mixed with the intermediate fluid 164, this raises no issue, because the base liquid 140l is a liquid similar to the intermediate fluid 164. Conversely, if the intermediate fluid 164 flows from the middle chamber 166 into the fluid chamber 114 through the seal gap 162g, and if the intermediate fluid 164 is mixed with the base liquid 140l, the properties of the functional fluid 140 are not changed by the fluid 164. Thus, the torque adjustment characteristic can be made stable.

The hollow object 110 is fixed at a position to rotatably support the adjustment rotor 130. The adjustment rotor 130 is braked by the brake torque given to the rotation shaft 131 according to the viscosity of the functional fluid 140. At this time, the adjustment characteristic of the brake torque can be made stable in the torque control device 100, since the generation of sludge is restricted with the high hardness coating film 165 of the seal structure 160. Therefore, the torque control device 100 applied to the valve timing control apparatus 1 can restrict a variation in the adjustment characteristic of brake torque, and the phase adjustment accuracy can be kept better.

Second Embodiment

Figure 8:
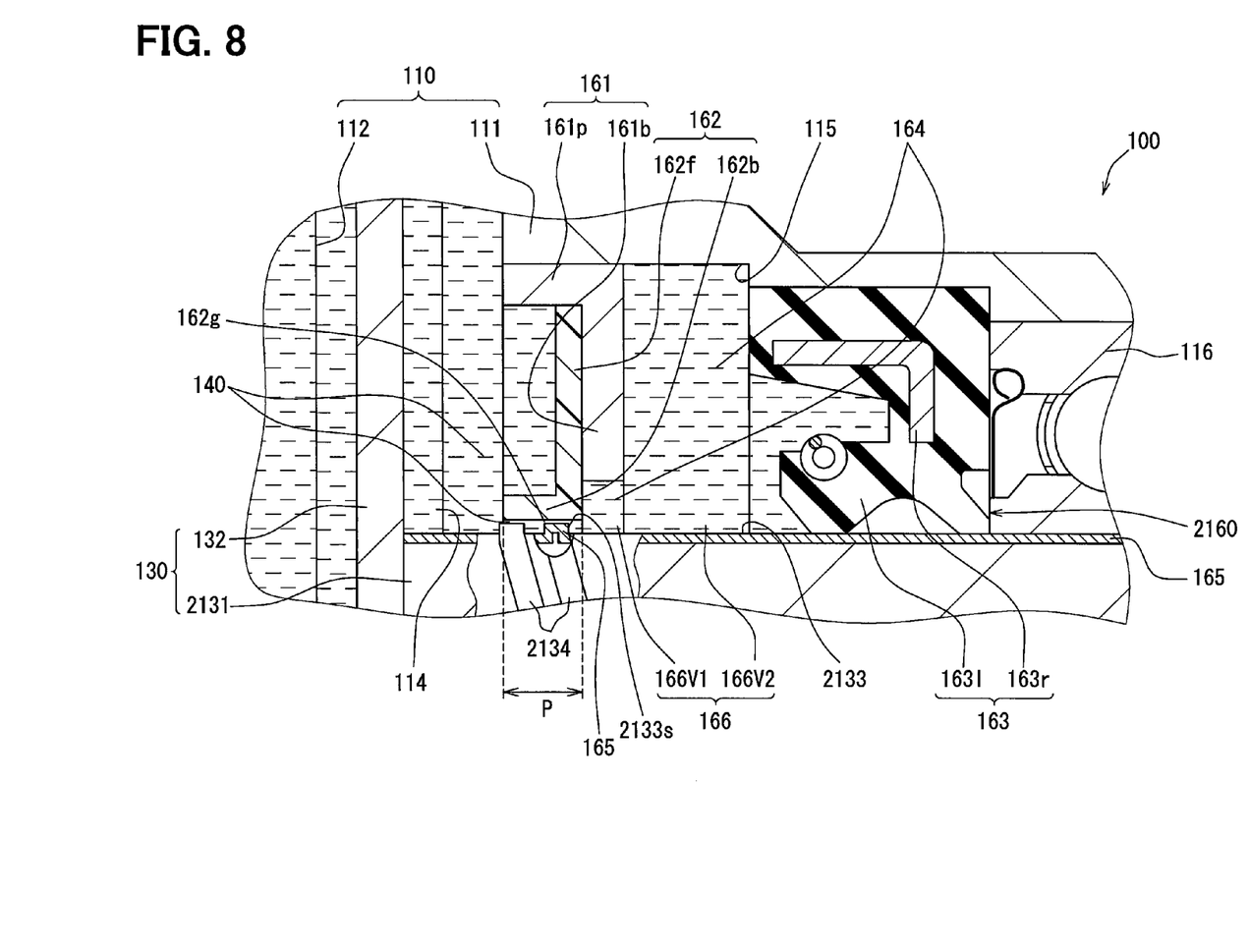
FIG. 8 is an enlarged cross-sectional view illustrating a seal structure of a torque control device according to a second embodiment.

As shown in FIG. 8, a torque control device 100 according to a second embodiment is a modification of the first embodiment in which a fluid brake equipment is disposed to the valve timing control apparatus 1.

In the second embodiment, a seal structure 2160 is modified from the seal structure 160 of the first embodiment. Specifically, the coating film 165 is formed on the perimeter part 2133 of the rotation shaft 2131, and at least the seal perimeter part 2133s has a seal thread part 2134. The seal thread part 2134 is shaped in a male thread which is threaded away from the interior side of the hollow object to the exterior side of the hollow object in the axial direction when followed in the rotational direction Dr of the rotation shaft 2131.

In this embodiment, the seal thread part 2134 has the shape of a male thread threaded in parallel, and the outer diameter at the peak of the seal thread part 2134 is set substantially at a fixed value in the formation range P of the thread part 2134 in the axial direction. The formation range P is set as the same area as the range of the seal perimeter part 2133s of the perimeter part 2133. Further, an area which spreads on one side or the both sides of the seal perimeter part 2133s in the axial direction may be added to the formation range P.

In FIG. 8, the formation range P of the seal thread part 2134 spreads on both sides of the seal perimeter part 2133s. The coating film 165 covers the whole region of the projection and recess of the seal thread part 2134. The projection and recess of the seal thread part 2134 has a rectangular shape in the vertical cross-section along the axial direction in this embodiment. Alternatively, the projection and recess of the seal screw part 2134 may have a triangle shape in the cross-section.

Thus, the seal perimeter part 2133s is formed in the shape of male thread threaded away from the interior side toward the exterior side when followed in the rotational direction Dr. Therefore, a moment heading to the interior side is given to the base liquid 140l in the seal gap 162g spaced from the particle seal 162. Thereby, the base liquid 140l pumped to the inner side in the seal gap 162g can restrict the magnetic particle 140p from entering the gap 162g. Therefore, the generation of sludge can be further restricted together with the high hardness coating film 165 prepared at the seal perimeter part 2133s. Thus, the durability is improved, and the torque adjustment performance is made stable.

Third Embodiment

Figure 9:
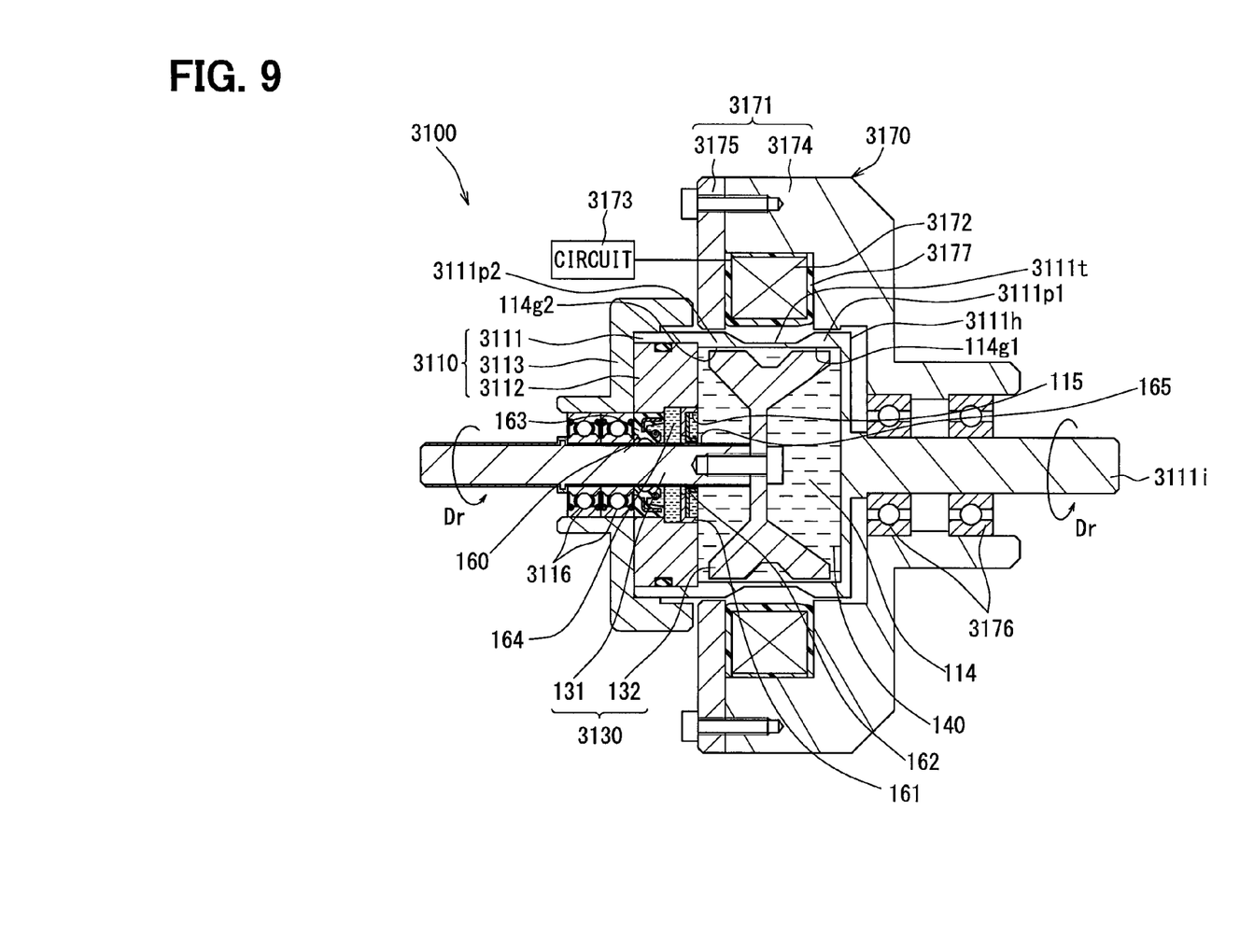
FIG. 9 is a cross-sectional view illustrating a torque control device according to a third embodiment.

As shown in FIG. 9, in a third embodiment, a torque control device 3100 is used as a liquid clutch equipment, and is prepared in a torque transfer system for a machine tool. The torque control device 3100 includes an electromagnetism unit 3170 which is not provided in the first embodiment, a hollow object 3110 and an adjustment rotor 3130 which are different from those of the first embodiment, and the functional fluid 140 and the seal structure 160 similar to those in the first embodiment.

The electromagnetism unit 3170 includes a case 3171, a solenoid coil 3172, and a current-carrying circuit 3173.

The case 3171 has a fixed component 3174 and a cover component 3175. The fixed component 3174 is formed in the shape of a stepped cylinder and is made of metal magnetic material. The fixed component 3174 is fixed at a position of a fixed portion (not shown) such as a base portion in the machine tool. The cover component 3175 is formed in the shape of a disk, and is made of metal magnetic material. The cover component 3175 is coaxially fastened to the large-diameter-side axial end portion of the fixed component 3174.

The solenoid coil 3172 has a plastic bobbin 3177 and a metal wire wound around the plastic bobbin 3177. The solenoid coil 3172 is inserted between the fixed component 3174 and the cover component 3175 in the axial direction so as to be coaxially held at the case 3171. The current-carrying circuit 3173 has a microcomputer, and is arranged to outside of the case 3171. The current-carrying circuit 3173 is electrically connected with the solenoid coil 3172 and a power supply (not shown) outside of the machine tool. The current-carrying circuit 3173 receives electric power supplied from the power supply, and controls the current supplied to the solenoid coil 3172.

The hollow object 3110 has a rotation component 3111, a cover component 3112, and a journal component 3113.

The rotation component 3111 integrally has an input shaft 3111$i$ and a rotation housing 3111$h$ with a based cylinder shape, and is made of metal magnetic material. The input shaft 3111$i$ is coaxially projected from the bottom wall part of the rotation housing 3111$h$. The axially intermediate part of the input shaft 3111$i$ is rotatably supported by a bearing 3176 disposed to the fixed component 3174 of the case 3171. A gap is defined between the peripheral wall part of the rotation housing 3111$h$ and the inner circumference part of the case 3171 and the solenoid coil 3172 in the radial direction, and the gap continues in the rotational direction Dr. The gap allows the rotation component 3111 to rotate. The peripheral wall part of the rotation housing 3111$h$ is formed thin at the intermediate position in the axial direction, so as to restrict the magnetic flux from passing in the axial direction. The peripheral wall part of the rotation housing 3111$h$ is defined to have a first magnetic flux passage part 3111$p1$ adjacent to the fixed component 3174 and a second magnetic flux passage part 3111$p2$ adjacent to the cover component 3175 through the thin-walled part 3111$t$.

The cover component 3112 is formed in the shape of a disk and is made of metal nonmagnetic material. The cover component 3112 is coaxially fixed to the rotation housing 3111$h$ by liquid-tightly fitting. The fluid chamber 114 filled with the functional fluid 140 is defined between the cover component 3112 and the rotation housing 3111$h$, and the cover component 3112 is able to rotate with the rotation housing 3111$h$. The components 161, 162, 163, 164, 165 of the seal structure 160 are arranged at the inner circumference side of the fitting hole 115 formed in the cover component 3112, similarly to the first embodiment.

The journal component 3113 is formed in the shape of a stepped cylinder and is made of metal nonmagnetic material. The bearing 3116 is formed in the journal component 3113. The cover component 3112 is inserted between the journal component 3113 and the inner circumference surface of the peripheral wall of the rotation housing 3111$h$. In this state, the journal component 3113 is fixed to the outer circumference surface of the peripheral wall of the housing 3111$h$ by fitting. The journal component 3113 can rotate with the rotation housing 3111$h$ and the cover component 3112.

When the input shape 3111$i$ of the hollow object 3110 receives the input of torque transmitted with the machine tool, the hollow object 3110 rotates in the fixed rotational direction Dr.

The adjustment rotor 3130 has the rotation shaft 131 and the magnetic rotor 132. The rotation shaft 131 coaxially penetrates the cover component 3112 and the journal component 3113 of the hollow object 3110, and is supported by the bearing 3116. The adjustment rotor 3130 and the hollow object 3110 are able to have a relative rotation with each other. The magnetic rotor 132 is accommodated in the fluid chamber 114 of the hollow object 3110. A first magnetic gap 114$g1$ is formed between the magnetic flux passage part 3111$p1$ and the magnetic rotor 132, and a second magnetic gap 114$g2$ is formed between the magnetic flux passage part 3111$p2$ and the magnetic rotor 132. In the third embodiment, the magnetic gap 114$g1$, 114$g2$ continues in the rotational direction Dr between the magnetic rotor 132 and the magnetic flux passage part 3111$p1$, 3111$p2$ in the radial direction.

While the hollow object 3110 is rotated, the solenoid coil 3172 receives electricity current from the current-carrying circuit 3173, and generates the magnetic flux. At this time, the magnetic flux passes through the fixed component 3174, the first magnetic flux passage part 3111$p1$, the first magnetism gap 114$g1$, the magnetic rotor 132, the second magnetism gap 114$g2$, the second magnetic flux passage part 3111$p2$, and the cover component 3175 in this order. Therefore, the magnetic flux passes through the functional fluid 140 in the magnetic gap 114$g1$, 114$g2$ of the fluid chamber 114.

As a result, between the hollow object 3110 and the magnetic rotor 132 in the contact state with the functional fluid 140, a yield stress occurs by a variation in the viscosity of the fluid 140, and the input torque input to the input shaft 3111$i$ is transmitted as clutch torque in the direction Dr. When the viscosity of the functional fluid 140 is variably controlled according to the electricity current supplied from the current-carrying circuit 3173 to the solenoid coil 3172, the clutch torque given to the rotation shaft 131 in the rotational direction Dr can be accurately increased and decreased accordingly. In the third embodiment, the solenoid coil 3172 and the current-carrying circuit 3173 correspond to a viscosity control portion.

The similar advantages can be obtained in the third embodiment as the first embodiment. Moreover, according to the third embodiment, the clutch torque transmitted between the hollow object 3110 and the adjustment rotor 3130 which are relatively rotated with each other is given to the rotation shaft 131 in response to the control in the viscosity of the functional fluid 140. At this time, in the torque control device 3100, the generation of sludge can be restricted by the high hardness coating film 165 of the seal structure 160. Thus, the durability can be improved, and the adjustment characteristic of clutch torque can be made stable.

Other Embodiment

The present disclosure is limited to the above embodiments, and can be applied to various embodiment and combination thereof within a range which does not deviate from the scope of the present disclosure.

In a first modification about the first to third embodiments, while the functional fluid 140 is produced by suspending the magnetic particle 140$p$ in the base liquid 140$l$, the fluid 140 may be magnetic fluid other than magnetic viscous fluid. In this case, the dimension W of the seal gap 162$g$ and the surface coarseness R of the coating film 165 are suitably set by considering the outer diameter of the magnetic particle in the other magnetic fluid.

In a second modification about the first to third embodiments, the base liquid 140*l* and the intermediate fluid 164 may be nonmagnetic polar liquid (hydrophile property liquid) having similar properties with each other. The polar liquid may be based on polyethyleneglycolmonoether having a boiling point not less than 140° C., 1-octyl-3-methylimidazolium-bis(trifluoromethylsulfonyl)amide which is an ionic liquid having a coagulating point not more than −30° C., or water, for example.

In a third modification about the first to third embodiments, the base liquid 140*l* and the intermediate fluid 164 may be nonmagnetic liquid having different properties. In this case, for example, relative to the base liquid 140*l* which is the nonpolar liquid as explained by the first embodiment, the intermediate fluid 164 may be the polar liquid explained in the second modification or silicone oil which is difficult to be dissolved in the liquid 140*l*.

In a fourth modification about the first to third embodiments, the dimension W of the seal gap 162*g* may be set larger than or equal to the outer diameter (φ) of the magnetic particle 140*p*.

In a fifth modification about the first to third embodiments, the surface coarseness R of the coating film 165 may be set more than or equal to the outer diameter φ of the magnetic particle 140*p*.

In a sixth modification about the first to third embodiments, the particle seal 162 may be a mechanical seal such as O-ring made of rubber, or lip packing made from carbon, which does not have a filtering function.

In a seventh modification about the first to third embodiments, only a part of the rotation shaft 131, 2131 which includes the seal perimeter part 133*s*, 2133*s* surrounded by the particle seal 162 may be made with metal, and the remainder may be made of a material other than metal.

In an eighth modification about the first to third embodiments, the coating film 165 may be formed on the same area as the seal perimeter part 133*s*, 2133*s* of the perimeter part 133, 2133, or may be further formed in the part which spreads on one side or the both sides of the seal perimeter part 133*s*, 2133*s* in the axial direction in addition to the same area.

Figure 10:
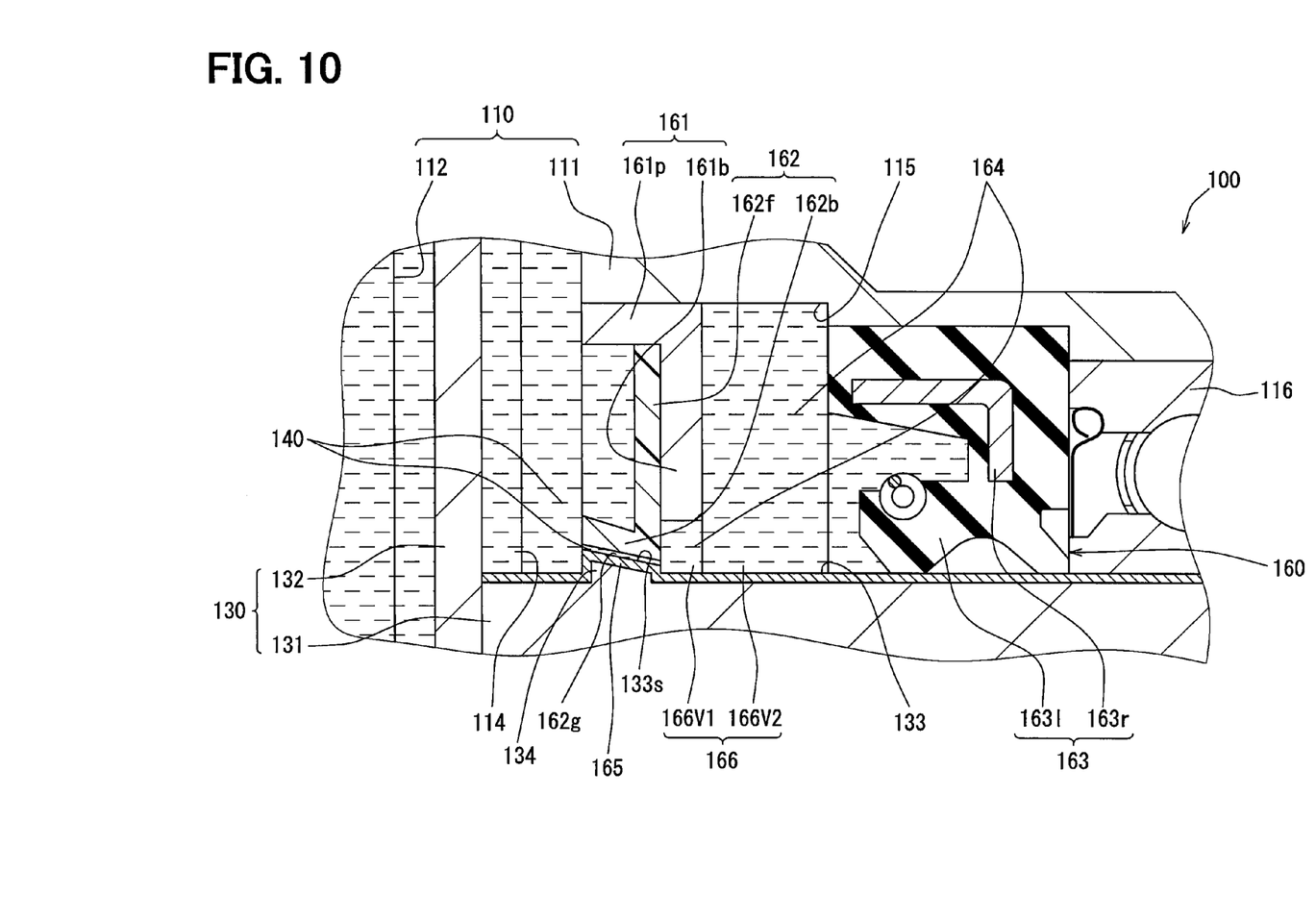
FIG. 10 is an enlarged cross-sectional view illustrating a modification of the seal structure in FIG. 5.

In a ninth modification about the first to third embodiments, as shown in FIG. 10, the inside diameter of the inner circumference part of the particle seal 162 (specifically, main part 162*b*) may be increased as it goes to the interior side from the exterior side in the axial direction. In this case, a projection 134 is formed at the seal perimeter part 133*s*, 2133*s*, and an outer diameter of the projection 134 is increased as it goes to the interior side from the exterior side in the axial direction, such that the dimension W of the seal gap 162*g* can be adjusted. FIG. 10 shows the ninth modification about the first embodiment.

Figure 11:
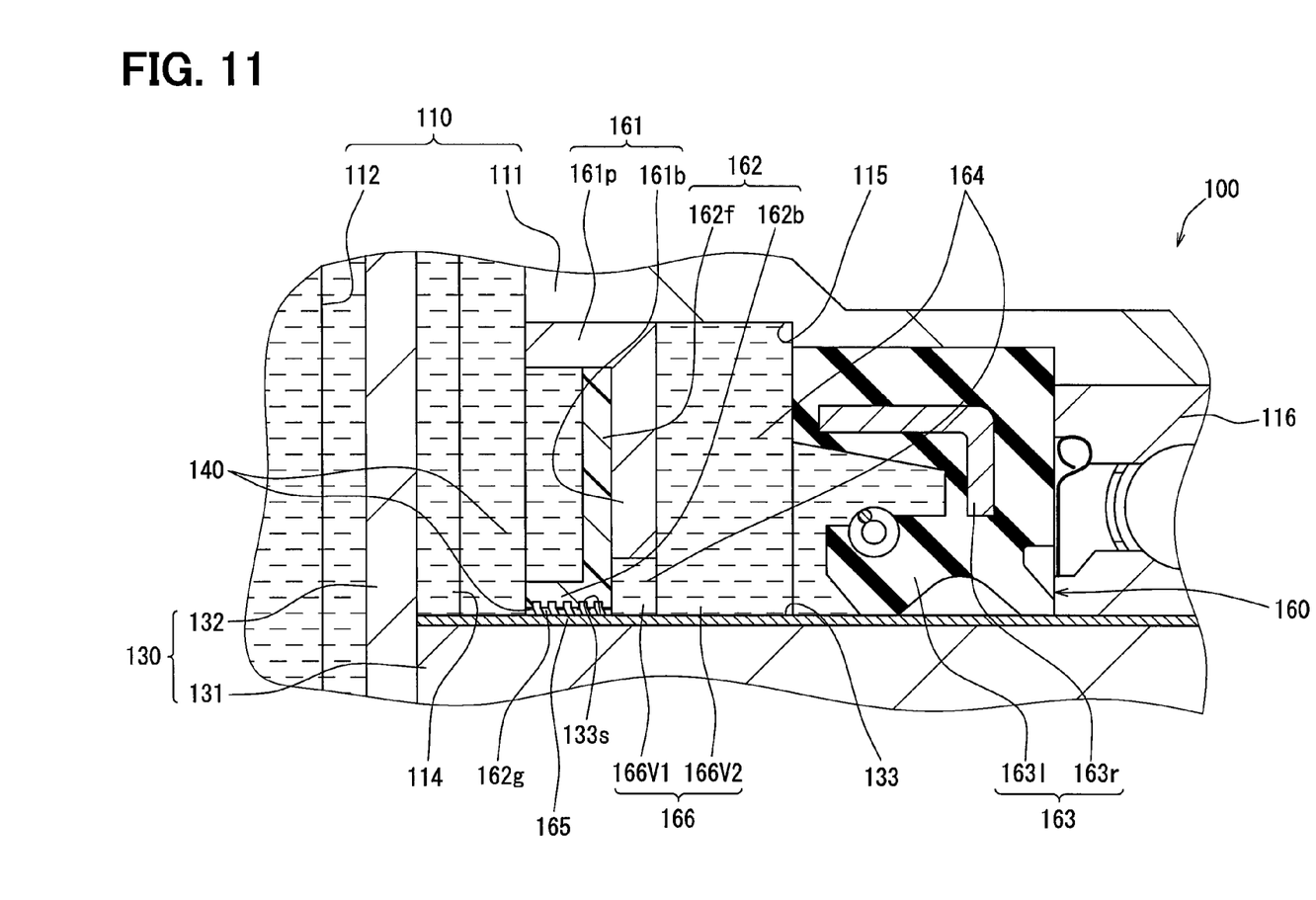
FIG. 11 is an enlarged cross-sectional view illustrating a modification of the seal structure in FIG. 5.

In a tenth modification about the first to third embodiments, as shown in FIG. 11, the inner circumference part of the particle seal 162 (specifically, main part 162*b*) may be shaped in a female thread threaded away from the exterior side toward the interior side when followed in the rotational direction Dr of the rotation shaft 131, 2131. FIG. 11 shows the tenth modification about the first embodiment.

In an eleventh modification about the first and second embodiments, the torque control device 100 may be applied to various kinds of fluid brake equipment using brake torque.

In a twelfth modification about the second embodiment, the seal thread part 2134 may be formed over whole of the perimeter part 2133.

In a thirteenth modification about the third embodiment, the seal structure 2160 of the second embodiment may be replaced with the seal structure 160.

Such changes and modifications are to be understood as being within the scope of the present disclosure as defined by the appended claims.

What is claimed is:

1. A torque control device comprising:
   a hollow object in which a fluid chamber is defined;
   a functional fluid in which a magnetic particle is suspended in a base liquid, the fluid chamber being filled with the functional fluid;
   a viscosity control portion variably controlling a viscosity of the functional fluid by causing a magnetic flux to pass through the functional fluid in the fluid chamber;
   an adjustment rotor having a rotation shaft which passes through the hollow object, the adjustment rotor contacting the functional fluid in the fluid chamber to control a torque given to the rotation shaft according to the viscosity of the functional fluid; and
   a seal structure sealing a clearance between the hollow object and the rotation shaft, wherein the seal structure including
   a particle seal surrounding a perimeter part of the rotation shaft and held by the hollow object, a seal gap being defined between the particle seal and the rotation shaft and communicating with the fluid chamber to regulate the magnetic particle from flowing out of the hollow object,
   a liquid seal held by the hollow object at an exterior side of the particle seal, the liquid seal being liquid-tightly in contact with the perimeter part of the rotation shaft to seal a clearance spaced from the rotation shaft,
   an intermediate fluid which fills a middle chamber defined between the particle seal and the liquid seal, and
   a coating film having a hardness higher than that of the magnetic particle, the coating film being arranged to the perimeter part of the rotation shaft, at least at a seal perimeter part made of metal, the seal gap being defined between the particle seal and the seal perimeter part.

2. The torque control device according to claim 1, wherein the coating film has a surface coarseness which is smaller than an outer diameter of the magnetic particle.

3. The torque control device according to claim 1, wherein the coating film is arranged on whole of the perimeter part of the rotation shaft.

4. The torque control device according to claim 1, wherein the coating film is made of a diamond-like carbon.

5. The torque control device according to claim 1, wherein the seal gap has a dimension which is smaller than an outer diameter of the magnetic particle.

6. The torque control device according to claim 1, wherein the seal perimeter part is shaped in a male thread threaded away from an inner side of the hollow object to an outer side of the hollow object when followed in a rotational direction of the rotation shaft.

7. The torque control device according to claim 1, wherein the particle seal is shaped in a mesh made of polytetrafluoroethylene.

8. The torque control device according to claim 1, wherein the intermediate fluid is a liquid having properties which are similar to properties of the base liquid.

9. The torque control device according to claim 1, wherein the hollow object is fixed at a position to rotatably support the adjustment rotor, and a brake torque which brakes the adjustment rotor is controlled according to the viscosity of the functional fluid.

10. A valve timing control apparatus which controls a valve timing of a valve opened and closed by a camshaft by a torque transmitted from a crankshaft in an internal combustion engine, the valve timing control apparatus comprising:
- the torque control device according to claim 9; and
- a phase control mechanism linked with the rotation shaft outside of the hollow object, wherein the phase control mechanism controls a relative phase of the camshaft relative to the crankshaft according to the brake torque given from the rotation shaft.

11. The torque control device according to claim 1, wherein
- the hollow object and the adjustment rotor are arranged so that a relative rotation is with each other, and
- a clutch torque transmitted between the hollow object and the adjustment rotor is controlled according to the viscosity of the functional fluid.

* * * * *